United States Patent [19]
Buksa et al.

[11] Patent Number: 6,082,382
[45] Date of Patent: Jul. 4, 2000

[54] CONTINUOUS WASHING DEVICE FOR VEGETABLES, FIBER, OR OTHER MATERIALS

[76] Inventors: Eric Buksa, P.O. Box 531, Freedom, Calif. 95019; Paul DeGrandpre, 21131 S. Jubb Rd., Estacada, Oreg. 97023; John Wylie, 17970 Vierra Cyn, Salina, Calif. 93907

[21] Appl. No.: 09/225,165

[22] Filed: Jan. 4, 1999

Related U.S. Application Data

[60] Provisional application No. 60/022,095, Jul. 16, 1996.

[51] Int. Cl.[7] ............................................. B08B 3/10
[52] U.S. Cl. .......................... 134/104.3; 15/3.15; 134/66; 134/68; 134/104.4; 134/117; 134/134; 134/140; 134/147; 134/154; 134/155; 134/157
[58] Field of Search ................................ 134/25.3, 66, 68, 134/104.3, 104.4, 117, 118, 134, 140, 147, 154, 155, 157, 160, 161, 163; 15/3.14, 3.15

[56] References Cited

U.S. PATENT DOCUMENTS

| | | | |
|---|---|---|---|
| 711,612 | 10/1902 | Allen | 134/66 |
| 2,163,977 | 6/1939 | Ferry | 134/104.4 |
| 2,580,420 | 1/1952 | Griswold et al. | 134/104.4 X |
| 2,647,525 | 8/1953 | Duda et al. | 134/104.4 X |
| 3,093,174 | 6/1963 | Warren | 134/25.3 X |
| 3,447,544 | 6/1969 | Vergara | 15/3.15 X |

*Primary Examiner*—Philip R. Coe
*Attorney, Agent, or Firm*—Mark E. Ogram P.C.

[57] ABSTRACT

An cleaning mechanism especially well suited for agricultural products in which the agricultural products are moved by a flow of water through a channel in which the water is agitated by vibration of the channel. The agitation of the water, together with contact with other products, dislodges dirt, rocks, and other debris from the products. The dislodged debris settles into troughs at the bottom of the channel. The washed agricultural products fall over a baffle at the end of the channel and are ready for packaging. In one embodiment of the invention, the cleaning system is conveyed through the agricultural field to clean the product immediately after harvest so that the agriculture product leaves the field in a wrapped or packaged state.

18 Claims, 5 Drawing Sheets

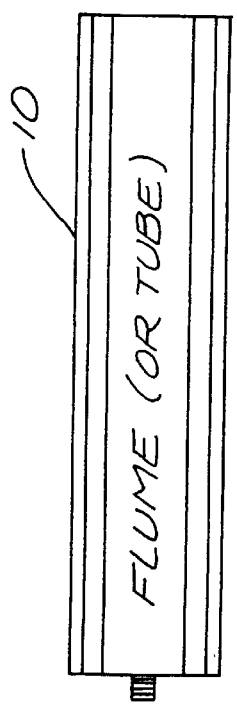
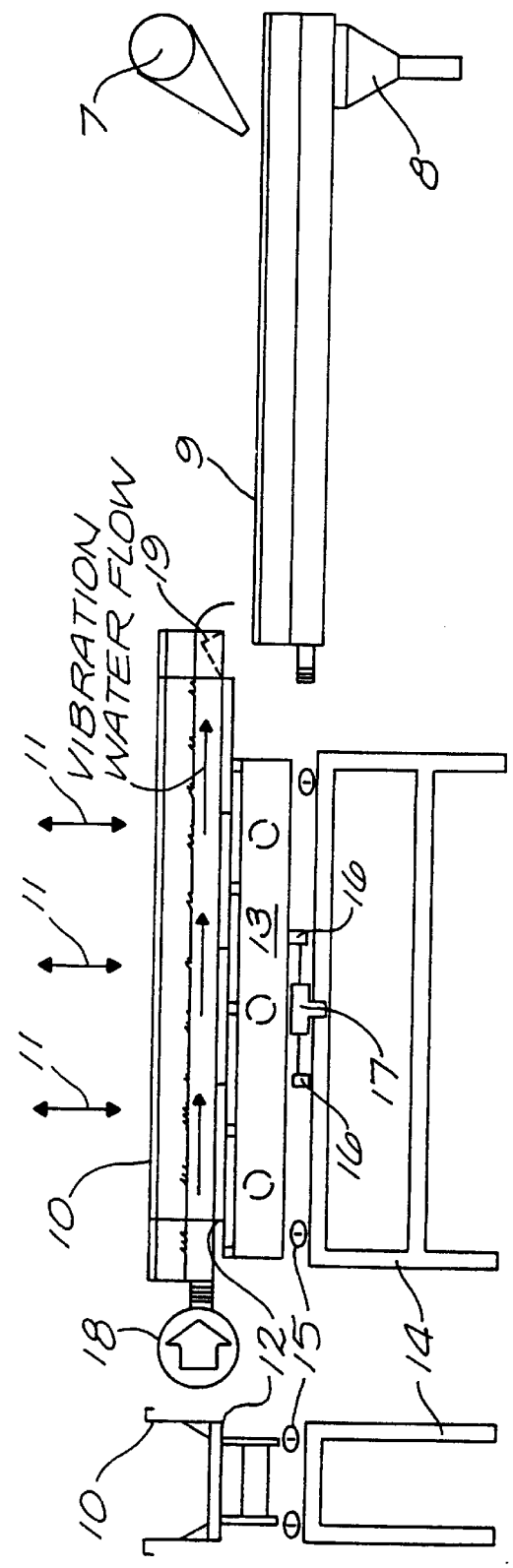
FIG. 1B
FIG. 1A
FIG. 1C

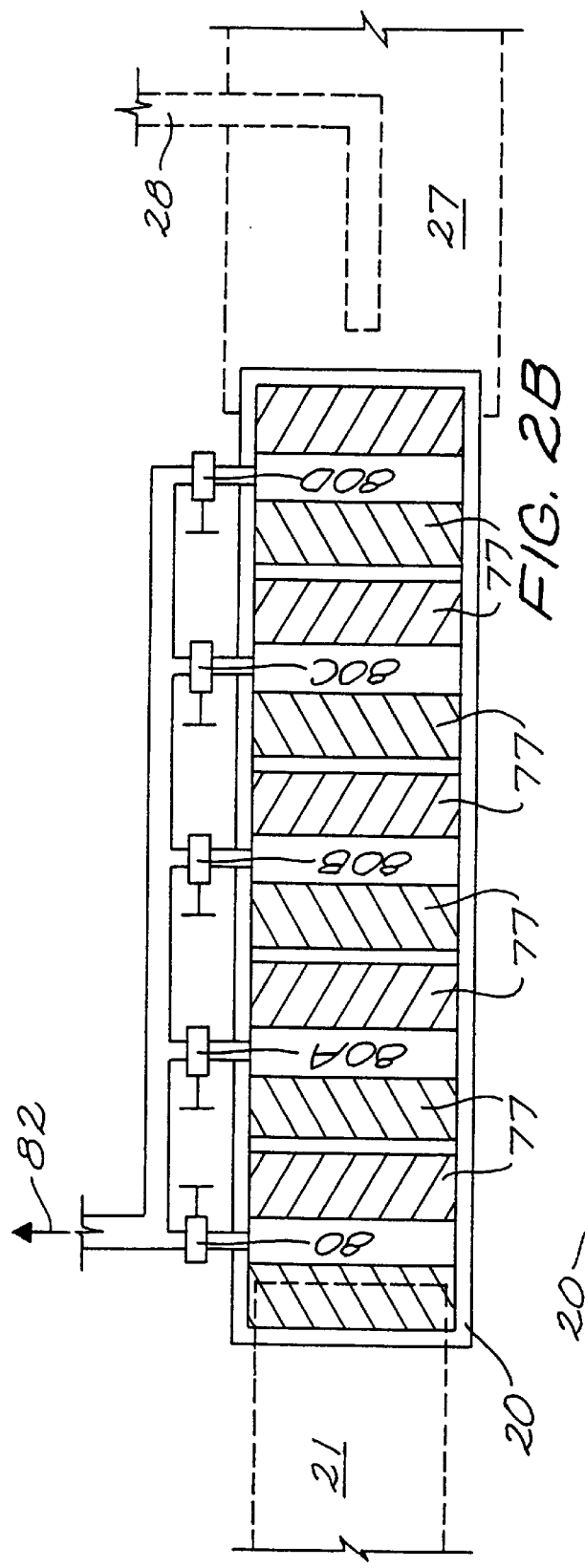
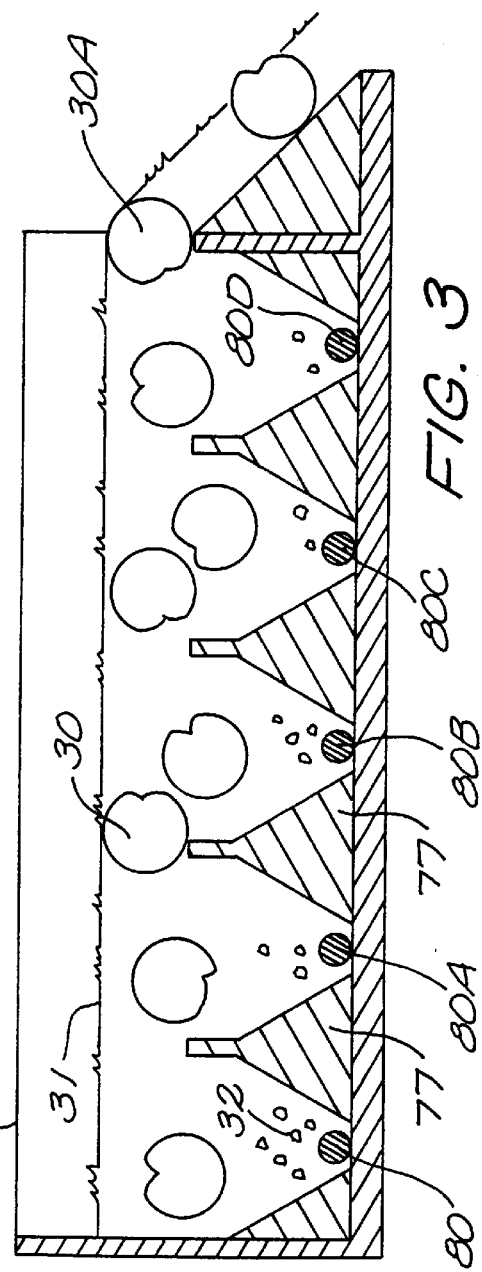

CONTINUOUS WASHING DEVICE FOR VEGETABLES, FIBER, OR OTHER MATERIALS

This is a continuation-in-part of U.S. Provisional Patent Application Ser. No. 60/022,095, entitled "Continuous Washing Device for Vegetables, Fiber, or other Materials" filed Jul. 16, 1996.

BACKGROUND

This invention relates generally to machines adapted for washing and more particularly to machines adapted for washing vegetables, fiber, and other materials.

The need to provide a continuous washing apparatus for a variety of materials, including vegetables, has been addressed by a variety of mechanisms.

One method uses a flume-washer for salad-vegetables, (leaf-lettuce in particular). This technique consists of vertically, or near vertically, vibrating the flume such that pulses of water rise and fall, agitating and mixing the product in a manner that is prone to dislodge sand, soil, clay and other matter that might be attached to the leaves. Vibratory mixing also enhances heat-transfer for chilling or heating.

A variety of other approaches have been taken which attempt to provide a washer for vegetables and the like. Kim et al, in U.S. Pat. No. 5,452,594, describes a vibratory washer, in which a batch of product is cleaned, this method though uses a great deal of water.

In U.S. Pat. No. 4,860,874, a vibrating trough is created with a series of transverse ridges designed to separate different weights of heavier than water particulates. The trough is reciprocated from side-to-side.

It is clear that there is a need for an efficient washer which uses water in an optimal manner.

SUMMARY OF THE INVENTION

The discussion below relates to the use of the invention to clean agricultural products. While this is the preferred application for the invention, the apparatus also is useful for a variety of other applications such as fiber dying, chemical processing (i.e. tanning) of animal hides, and a variety of other applications that those of ordinary skill in the art recognize.

This invention is an cleaning mechanism especially well suited for agricultural products in which the agricultural products are moved through a channel or flume. Water within the flume is agitated by vertical or nearly vertical vibration of the channel. While the vertical agitation cleans the product, water flow through the flume moves the product through the cleaning process.

In this context, "agricultural products" includes a wide range of items including, but not limited to, vegetables, organic fibers, and fruit. Those of ordinary skill in the art readily recognize a variety of products which require cleaning prior to retail sale or use in manufacturing.

The channel used in this invention is a horizontal flume through which the materials to be cleaned or processed are passed. The products are deposited into one end of the flume, and due to the flow of water, traverse down the flume to exit at an opposing end.

During the traversal of the products, the horizontal flume is vibrated to cause extreme water agitation. The agitation causes the water to "scrub" the product and dislodge soil, clay, and other contaminates or enhance heat transfer or chemical contact. At points along the channel, the exhaust water and materials pass through a relatively "calm" section which permits the particles to precipitate leaving only the cleaned product; the water from the process is recycled to the horizontal flume so that little water is wasted.

In this invention, the movement of the water, together with contact with other products, dislodges dirt, clay, rocks, and other debris. Located within the channel is a series of baffles which form troughs in the bottom of the channel.

These troughs permit precipitates to settle away from the agricultural product being cleaned and direct the precipitates to an exit or flushing location. In this manner, the dislodged dirt and other debris is separated to be properly disposed.

After the dirt and debris has been removed, the washed agricultural products are removed from the channel. In the preferred embodiment, the cleaned products "fall" over a weir or baffle at the end of the channel. The products are carried over the baffle by the stream of water through the flume.

In the preferred embodiment, the exiting water and product are deposited onto a screen or inclined rod-grid which separates excess water (which is recycled by a pump into the channel) and the cleaned product (which is now ready for packaging).

In operation, "dirty" product is deposited into one end of the flume/channel and clean product, ready for retail packaging, is collected at the other end of the flume/channel.

In one embodiment of the invention, the system is conveyed through the agricultural field to clean the product immediately after harvest so that the agriculture product leaves the field in a wrapped or packaged state. In this embodiment, a trailer or vehicle is equipped with conveyors to collect the freshly picked product from the human pickers.

These conveyors move the freshly harvested product from the agricultural field and dump the harvested product into a cleaner as described above. The cleaner is mounted onto the trailer or vehicle and moves through the agricultural field with the human pickers.

The product flows through the cleaner and exits ready for packaging, which, preferably, is also performed on the trailer or vehicle. The packaged product is collected and removed from the agricultural field, ready for distribution to retail outlets.

The invention, together with various embodiments thereof, will be more fully explained by the accompanying drawings and following description.

DRAWINGS IN BRIEF

FIGS. 1A, 1B, and 1C, are side, top, and end views of an embodiment of the invention.

FIG. 2A is a side view of the preferred embodiment of the invention.

FIG. 2B is a top view of the preferred embodiment of the invention illustrating the baffles and discharge ports.

FIG. 3 illustrates the operation of the baffles in the preferred embodiment.

FIG. 4 is a side view of the eccentric wheels causing vibration in the channel of the preferred embodiment.

FIG. 5 is a close-up view of the preferred operator control panel.

FIG. 6A is a top view of a harvesting mechanism which is pulled through the agricultural field.

FIG. 6B is a side view of a self-propelled harvesting mechanism.

DESCRIPTION OF THE DRAWINGS

FIGS. 1A, 1B, and 1C, are side, top, and end views of an embodiment of the invention.

Figure 2A:
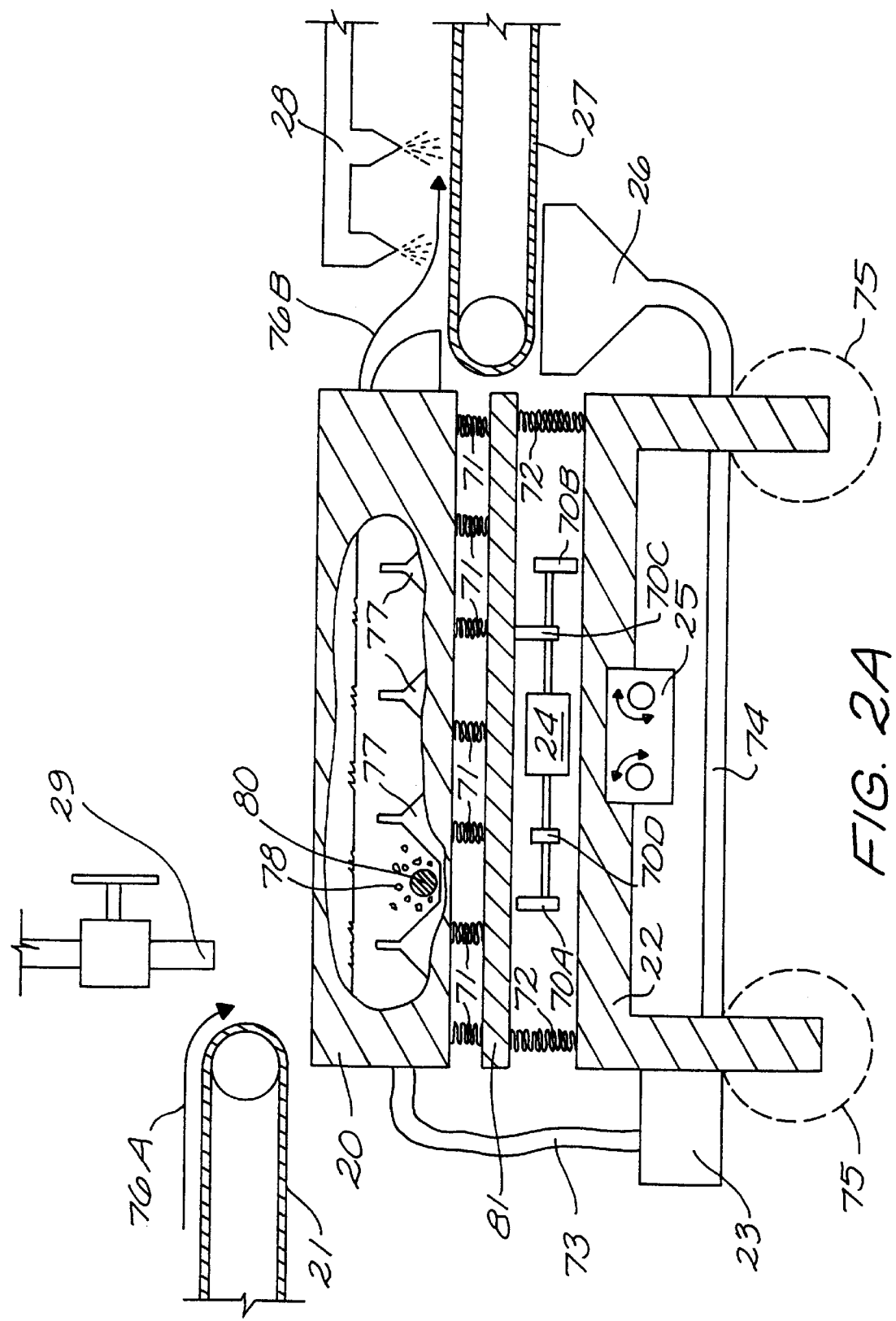

Flume (channel or tube) 10 is vibrated substantially vertically (as shown by arrows 11). Springs 12 are attach to excited base 13. In this context, springs 12 are either coil or leaf springs. Excited base 13 is mounted on a base-frame 14 with flexible mounts 15. In an alternative embodiment, excited base is mounted directly to the floor via flexible mounts 15.

A plurality of counter-rotating weight mechanisms 16, such as an "Ajax" shaker, or other method of inducing periodic exciting force are rotated by motor 17 to cause the vertical excitement of flume 10.

One preferred (but certainly not the only method of inducing vertical vibration to the fume or tube) is to modify the technologies of U.S. Pat. No. 4,313,535, entitled "Excited Frame, Vibratory Conveying Apparatus for Moving Particulate Material" issued to Carmichael on Feb. 2, 1982; or U.S. Pat. No. 4,218,929, entitled "Vibrating Device for Feeders and the Like" issued on Aug. 26, 1980, to Spurlin (both, incorporated hereunto by reference) as taught by the present invention.

The vibrations created by the counter-rotating weight mechanisms 16 are adapted to wash the product through the resulting agitation of water within flume 10; water flow from pump 18 is used to convey the product through flume 10.

Weir 19 controls the water depth within flume 10.

In this embodiment, secondary flume 9 operates without vibration and contains heavy particulate trap 8 and foam-vacuum 7. Upon leaving secondary flume 9, the product passes over a de-watering screen (not shown) and excess water is recirculated by pump 18. In some embodiments, a heater or chiller, particulate screen, or other treatment, is performed prior to the return of the water to the start of flume 10.

FIG. 2A is a side view of the preferred embodiment of the invention.

In this embodiment, a single channel or flume 20 is fed agricultural products via conveyor 21 as indicated by arrow 76A. The agricultural product falls into channel 20 and is conveyed by the water flow to exit over an end-baffle as indicated by arrow 76B.

Channel 20 is mounted to frame 22 via springs 72, intermediate frame 81, and springs 71. Intermediate frame 81 is agitated by motor 24 which rotates eccentric cams 70A, 70B, 70C, and 70D. As the eccentric cams contact and then move away from intermediate frame 81, a "near" system harmonic vibration is established in springs 71 which agitates water within channel 20.

The water flows over baffles 77 from one end of channel 20 to an opposing second end. Baffles 77 form valleys into which particulates 78 are deposited. These particulates 78 are periodically flushed from channel 20 by opening exit port 80.

While the primary source of water is via outlet 29, flow of the water within channel 20 is maintained by pump 23. Cleaned product together with water exits channel 20 as indicated by arrow 76B. Conveyor 27 transports the cleaned product away and permits excess water to be collected by collector 26. A final spray from nozzles 28 is also used in one embodiment to provide a final wash for the product.

The water collected by collector 26 is conveyed to pump 23 via hose 74. The water is then delivered back to channel 20 via hose 73.

In one embodiment of the invention, wheels 75 are added to frame 22, thereby permitting the assembly to be moved from one location to another or to facilitate repairs of the cleaning mechanism.

The speed of motor 24 (and by extension the level of water agitation) and the volume of pump 23 are controlled by an operator via panel 25. In this manner, the cleaning mechanism is adapted by the operator to address the characteristics of the product being cleaned. As example, the agitation level for tomatoes would be less than that used for oranges; but, the dwell time (established by the speed of pump 23) would be longer for tomatoes. Tomatoes are given a "gentle" wash.

FIG. 2B is a top view of an embodiment of the invention illustrating the baffles and discharge ports.

Channel 20 has a plurality of baffles 77 which form valleys into which the particulates settle. Periodically, the operator opens valves 80, 80A, 80B, 80C, and 80D, to flush the particulates from the valleys and exhausted as shown by arrow 82.

In this manner, channel 20 is easily cleaned either during agitation or during a lull in operation.

FIG. 3 illustrates the operation of the baffles in the preferred embodiment.

As noted earlier, baffles 77 form valleys over which product 30 is moved by the flow of water 31 through channel 20. Agitation of water 31 dislodges dirt and debris to be removed from product 30 so that particulates 32 precipitate to the bottom of the valley formed by baffles 77.

When the precipitate level becomes sufficient, the operator opens exit ports 80 or 80D to rinse the precipitates from channel 20.

The product moves through channel 20 until it is carried over a final baffle (or depth-controlled weir), as indicated by product 30A. The now-clean product falls to the carry-away conveyor (not shown) where excess water is drained and the product is ready for packaging.

Figure 4:
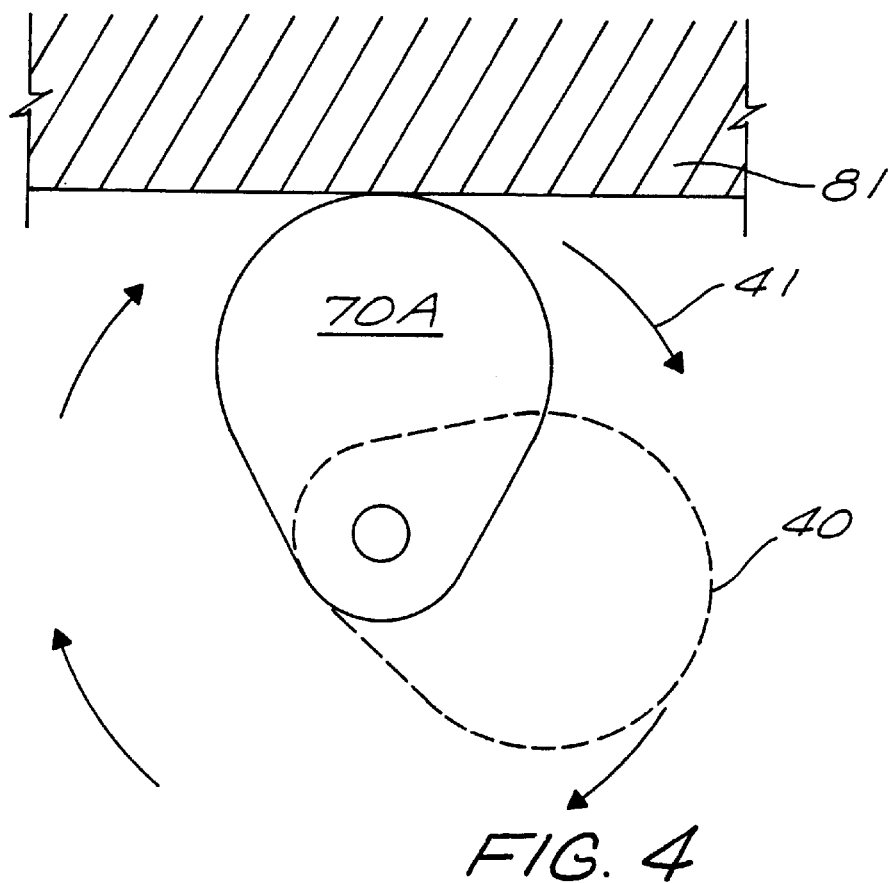

FIG. 4 is a side view of the eccentric wheels used to create vibration in the channel of the preferred embodiment.

Eccentric wheel 70A, driven by a motor not shown, rotates as indicated by arrow 41 resulting in eccentric wheel 70A being periodically in contact to "push" intermediate frame 81. At other times, as shown by 40, eccentric wheel 70A does not contact the intermediate frame 81 allowing intermediate frame 81 to "bounce" back.

This periodic pushing/release of intermediate frame 81 causes agitation of the water within the channel (not shown). The agitation works as the cleaning operation discussed earlier.

Figure 5:
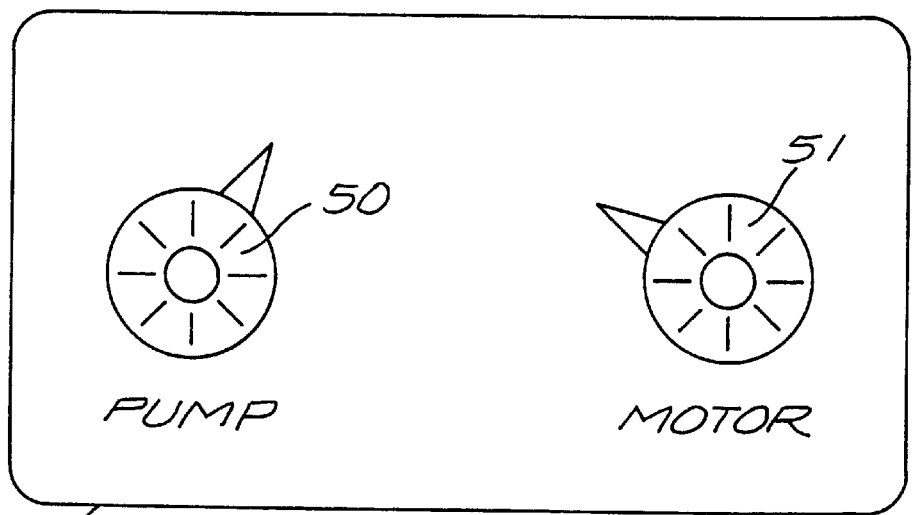

FIG. 5 is a close-up view of the preferred operator control panel.

Control panel 25 permits the operator to rotate rheostat 50 or 51 to adjust the speed of operation of the pump and motor respectively. In this manner, the operator is able to control both the pump (thereby establishing the flow-through rate or dwell time within the channel) and the cleaning action (the motor which agitates the water within the channel).

Figure 6A:
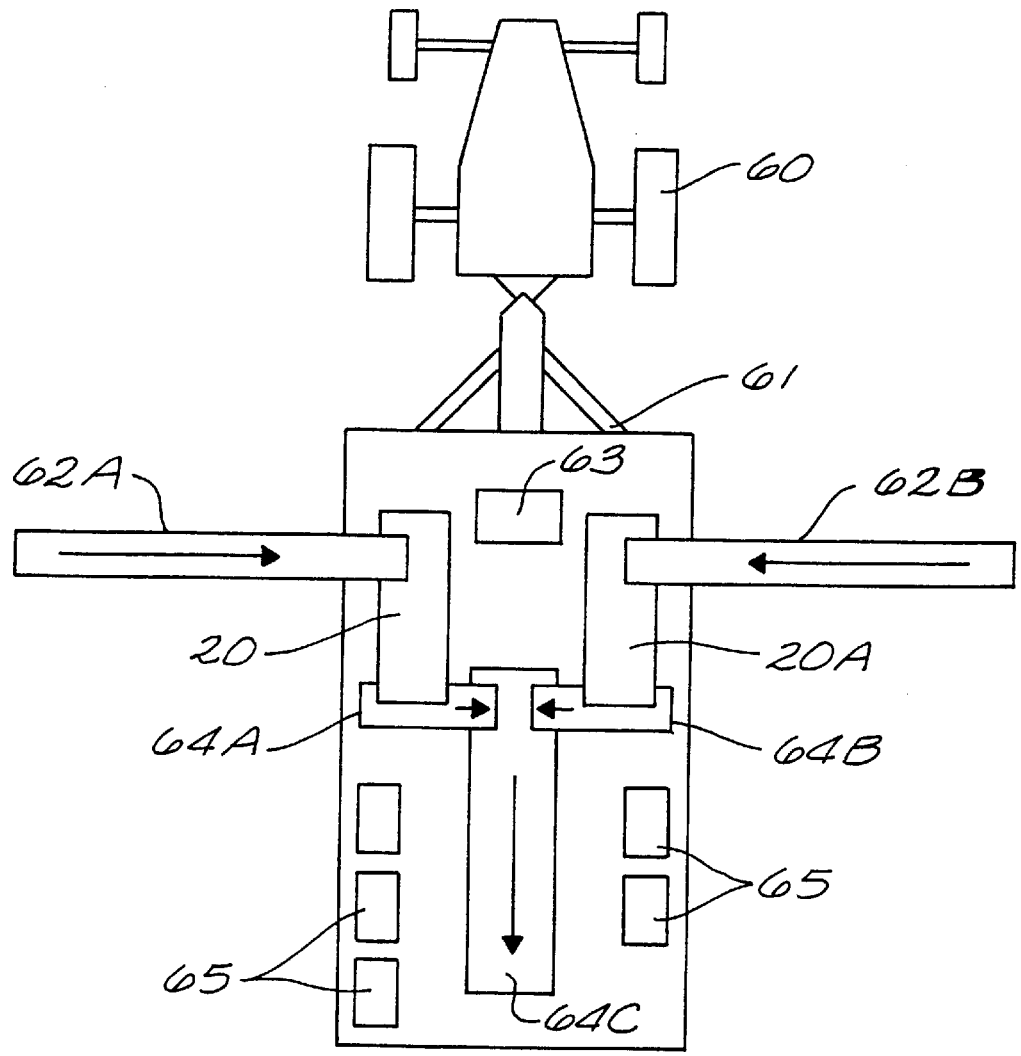

FIG. 6A is a top view of a harvesting mechanism which is pulled through the agricultural field.

Tractor 60 pulls harvesting trailer 61 through the agricultural field. Collection conveyors 62A and 62B extend from harvesting trailer 61 and collect the harvest from pickers. The harvest is conveyed to cleaning channels 20 and 20A where the harvest is cleaned of dirt. Operator control panel 63 permits the operator to monitor and adjust operation of the various conveyors and cleaning channels. A reservoir, located beneath harvesting trailer 61 provides fresh water for cleaning channels 20 and 20A.

In one embodiment of the invention, harvesting trailer 61 is self-propelled. In this embodiment, operator control panel 63 is adapted to permit the operator to control the speed and direction of the self-propelled unit as well.

The cleaned product is deposited into conveyors 64A and 64B by cleaning channels 20 and 20A respectively. Conveyors 64A and 64B deposit the product onto packing conveyor 64C from which human packers place the product into boxes 65.

In this manner, the agricultural product is picked, cleaned, and packaged for sale before it leaves the agricultural field.

Figure 6B:
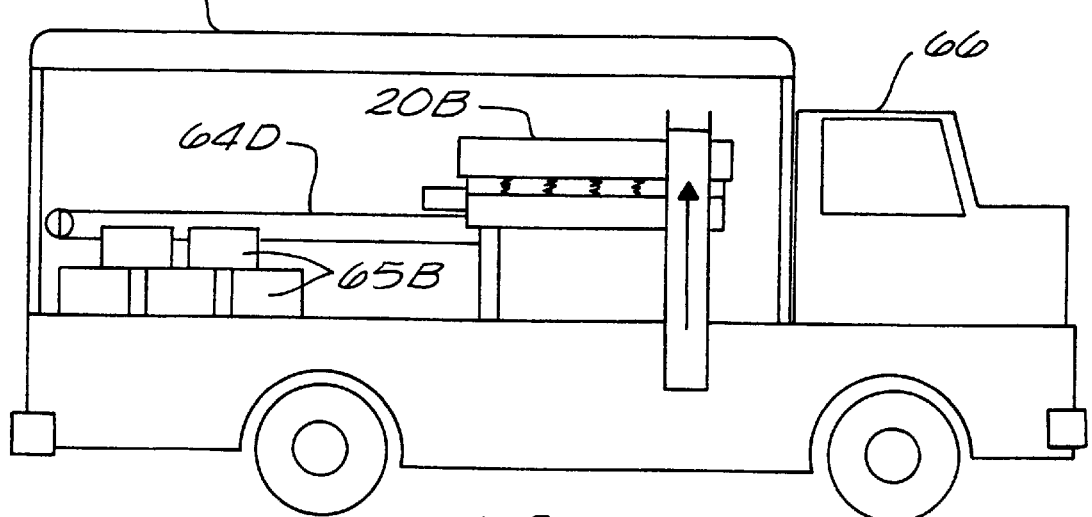

FIG. 6B is a side view of a self-propelled harvesting mechanism.

Truck 66 is equipped with shade 67 to protect the crew. As in FIG. 6A, the product is harvested and conveyed to cleaning channel 20B from which it is communicated down conveyor 64D for the human packers to put the cleaned product into boxes 65B.

This embodiment is entirely self-propelled permitting the assembly to be easily moved from one site to another.

It is clear that the present invention creates a highly improved washer with exceptional recycle qualities.

What is claimed is:

1. A cleaning mechanism comprising:
   a) a frame member;
   a) a channel connected to said frame member by a plurality, but at least two springs;
   b) a motor, mounted to said frame member and adapted to cause repetitive relative motion between said channel and said frame member;
   c) a pump, mounted to said frame member and adapted to apply water to a first end of said channel; and,
   d) an exit baffle attached to a second end of said channel, said exit baffle adapted to permit vegetables and water to exit said channel.

2. The cleaning mechanism according to claim 1, further including eccentric wheels rotationally driven by said motor and in contact with said channel.

3. The cleaning mechanism according to claim 2, further including a control panel for user control of:
   a) a rotational speed of said motor; and,
   b) a water volume flow of said pump.

4. The cleaning mechanism according to claim 1, further including:
   a) means for applying water to said channel; and,
   b) means for depositing product at the first end of said channel.

5. The cleaning mechanism according to claim 4, further including wheels attached to said frame member, said wheels adapted to support said frame member.

6. The cleaning mechanism according to claim 4, further including as take away means for continuously:
   a) accepting water and vegetables from said exit baffle;
   b) separating excess water from said vegetables; and,
   c) depositing vegetables into a hopper.

7. The cleaning mechanism according to claim 1, further including:
   a) one or a plurality of discharge ports, each of said discharge ports communicating through a lower portion of said channel;
   b) a plurality of baffles located within said channel and adapted to direct precipitates to said discharge ports; and,
   c) means for selectively opening said discharge ports.

8. A mechanism to treat product comprising:
   a) a channel containing water;
   b) agitation means attached to said channel for causing said channel to vibrate at an operator defined frequency;
   c) pump means for providing water to a first end of said channel;
   d) application means for depositing to-be-treated product at the first end of said channel; and,
   e) extraction means for withdrawing treated product from a second end of said channel.

9. The mechanism to treat product according to claim 8, further including operator adjustment means for establishing a water volume flow of said pump means.

10. The mechanism to treat product according to claim 8, further including:
    a) a plurality of baffles located within said channel; and,
    b) a plurality of discharge ports, each of said discharge ports adapted to communicate water from said channel.

11. The mechanism to treat product according to claim 10, wherein said baffles are adapted to direct precipitates within said channel to said discharge ports.

12. The mechanism to cleanse vegetables according to claim 11, further including means for selectively opening said discharge ports.

13. The mechanism to treat product according to claim 8, wherein said extraction means includes an exit baffle located at the second end of said channel, said exit baffle adapted to permit vegetables and water to pass over said exit baffle and leave said channel.

14. The mechanism to treat product according to claim 13, further including as takeaway means for continuously:
    a) accepting water and vegetables passing from exit baffle;
    b) separating excess water from said treated product; and,
    c) depositing treated product into a hopper.

15. The mechanism to treat product according to claim 14, wherein said pump means is adapted to draw said excess water from said takeaway means.

16. A harvesting apparatus comprising:
    a) a frame member supported by support wheels;
    b) driving means adapted to selectively rotate at least one of said support wheels;
    c) collection means, connected to said frame member, for moving freshly harvested vegetables from a harvesting site to a receiving location;
    d) a vegetable cleaning mechanism having,
       1) a channel connected to said frame member by at least two springs,
       2) a motor, mounted to said frame member and adapted to cause repetitive relative motion between said channel and said frame member,
       3) a pump, mounted to said frame member and adapted to apply water to a first end of said channel, and,
       4) an exit baffle attached to a second end of said channel, said exit baffle adapted to permit vegetables and water to exit said channel;
    e) a reservoir containing water, said reservoir communicating water to said channel;
    f) takeaway means for continuously:

1) accepting water and vegetables from said exit baffle, and,
2) separating excess water from said vegetables; and,
g) a control panel for user control of,
1) a speed of said driving means,
2) a rotational speed of said motor, and,
3) a water volume flow of said pump.

17. The harvesting apparatus according to claim 16, further including eccentric wheels rotationally driven by the motor of said cleaning mechanism, said eccentric wheels adapted to periodically contact a base of said channel.

18. The harvesting apparatus according to claim 16, wherein said cleaning mechanism further includes:

a) a plurality of discharge ports, each of said discharge ports communicating through a lower portion of said channel;
b) a plurality of baffles located within said channel and adapted to direct precipitates to said discharge ports; and,
c) means for selectively opening said discharge ports and permitting precipitates to exit said channel through said discharge ports.

\* \* \* \* \*